United States Patent
Creta et al.

(10) Patent No.: US 6,976,115 B2
(45) Date of Patent: Dec. 13, 2005

(54) PEER-TO-PEER BUS SEGMENT BRIDGING

(75) Inventors: Kenneth Creta, Gig Harbor, WA (US);
Jasmin Ajanovic, Portland, OR (US);
Joseph Bennett, Roseville, CA (US)

(73) Assignee: Intel Corporation, Santa Clara, CA (US)

(*) Notice: Subject to any disclaimer, the term of this patent is extended or adjusted under 35 U.S.C. 154(b) by 530 days.

(21) Appl. No.: 10/112,344

(22) Filed: Mar. 28, 2002

(65) Prior Publication Data

US 2003/0188072 A1  Oct. 2, 2003

(51) Int. Cl.⁷ ............................. G06F 13/36; G06F 3/00
(52) U.S. Cl. ........................ 710/310; 710/5; 710/313; 711/158
(58) Field of Search ..................... 710/1, 5, 62, 112, 710/306, 310, 312–314, 305; 709/253; 711/118, 711/158; 712/220, 245; 370/351, 401

(56) References Cited

U.S. PATENT DOCUMENTS

| | | | | |
|---|---|---|---|---|
| 5,859,988 A * | 1/1999 | Ajanovic et al. | ........... | 710/306 |
| 5,898,888 A * | 4/1999 | Guthrie et al. | ............... | 710/312 |
| 6,047,334 A * | 4/2000 | Langendorf et al. | ........... | 710/5 |
| 6,073,210 A * | 6/2000 | Palanca et al. | ............. | 711/118 |
| 6,088,772 A * | 7/2000 | Harriman et al. | ........... | 711/158 |
| 6,157,977 A * | 12/2000 | Sherlock et al. | ............ | 710/310 |
| 6,173,378 B1 * | 1/2001 | Rozario et al. | ............. | 711/163 |
| 6,175,888 B1 * | 1/2001 | Guthrie et al. | ............... | 710/310 |
| 6,182,178 B1 * | 1/2001 | Kelley et al. | ................ | 710/314 |
| 6,223,238 B1 * | 4/2001 | Meyer et al. | ................ | 710/312 |
| 6,347,349 B1 * | 2/2002 | Neal et al. | ..................... | 710/62 |
| 6,356,953 B1 * | 3/2002 | Meyer et al. | ............... | 709/253 |
| 6,499,079 B1 * | 12/2002 | Gulick | ........................ | 710/305 |
| 6,529,963 B1 * | 3/2003 | Fredin et al. | ................... | 710/1 |
| 6,529,991 B1 * | 3/2003 | Beukema et al. | ........... | 710/313 |
| 6,671,747 B1 * | 12/2003 | Benkual et al. | ................ | 710/1 |
| 6,687,240 B1 * | 2/2004 | Moertl et al. | ................ | 370/351 |
| 6,754,751 B1 * | 6/2004 | Willke | ........................ | 710/112 |
| 2003/0065868 A1 * | 4/2003 | Riley | ........................ | 710/313 |
| 2003/0123461 A1 * | 7/2003 | Riley | ........................ | 370/401 |
| 2004/0139267 A1 * | 7/2004 | Gillespie et al. | ........... | 710/306 |

* cited by examiner

*Primary Examiner*—Glenn A. Auve
*Assistant Examiner*—Christopher E. Lee
(74) *Attorney, Agent, or Firm*—Blakely, Sokoloff, Taylor & Zafman LLP

(57) ABSTRACT

A method and apparatus are described for facilitating proper ordering of peer-to-peer communications between bridged bus segments. According to one embodiment of the present invention a fence command is issued when a peer-to-peer communication between devices on separate bus segments connected on the same side of a bridge is detected. The fence command is inserted into a plurality of buffers in an I/O hub corresponding to the bus segments to force temporary ordering across all pipes of the I/O hub. The hub prohibits processing of subsequent commands from a buffer once a fence command has been read from that buffer until a corresponding fence command is read from all other buffers in the plurality of buffers therby assuring proper ordering of the peer-to-peer communication.

26 Claims, 9 Drawing Sheets

PEER-TO-PEER BUS SEGMENT BRIDGING

FIELD

The invention relates generally to the field of bus environment and bridge applications. More particularly, the invention relates to facilitating peer-to-peer communications between bridged bus segments.

BACKGROUND

Bus environments increasing rely on high bandwidth Input/Output (I/O) connections and components. One common application of a high bandwidth I/O interconnect is a bridging component that may, on one side, support a standard bus such as a Peripheral Component Interconnect (PCI) bus. The bridge may support single or multiple bus segments. The bridge then interconnects these bus segments to other system resources, such as main memory. Communications initiated on one of the bus segments then passes through the bridge and onto the interface with the other system resources.

Bus standards, such as PCI, provide a multi-drop bus. That is, multiple bus agents (devices) may exist on the same bus. On such multi-drop buses, it is easy to read from or write to other devices on the same bus. For example, a personal computer (PC) typically contains one PCI bus. In this case, it is easy for one device on the bus to perform a peer-to-peer communication with another device on the same bus.

However, as bus interface speed increases, bus architectures are moving away from multi-drop architectures and toward point-to-point architectures. As bus speed increases, point-to-point architectures become more important because a bus cannot operate at higher speeds with the load of multiple cards on the same interface. In architectures supporting multiple independent buses, peer-to-peer communications are not as straight forward as with the multi-drop bus. Synchronization is more important if peer-to-peer traffic is present in a point-to-point architecture. That is, with point-to-point architectures, proper ordering of the communications becomes important.

For example, two devices on separate bus segments connected on the same side of a bridge may communicate with one another. Keeping this peer-to-peer communication within the bridge and not passing it though to the other side of the bridge would yield greater performance. However, proper ordering of these peer-to-peer communications with those that do traverse the bridge then becomes an issue since, due to propagation and processing delays, various components of the bus environment may handle the communications out of order.

BRIEF DESCRIPTION OF THE DRAWINGS

The appended claims set forth the features of embodiments of the invention with particularity. The invention, together with its advantages, may be best understood from the following detailed description taken in conjunction with the accompanying drawings of which:

DETAILED DESCRIPTION

A method and apparatus are described for facilitating proper ordering of peer-to-peer communications between bridged bus segments. According to one embodiment of the present invention a fence command is issued when a peer-to-peer communication between devices on separate bus segments connected on the same side of a bridge is detected. The fence command is inserted into a plurality of buffers in an I/O hub corresponding to the bus segments to force temporary ordering across all pipes of the I/O hub. The hub prohibits processing of subsequent commands from a buffer once a fence command has been read from that buffer until a corresponding fence command is read from all other buffers in the plurality of buffers thereby assuring proper ordering of the peer-to-peer communication.

In the following description, for the purposes of explanation, numerous specific details are set forth in order to provide a thorough understanding. It will be apparent, however, to one skilled in the art that embodiments of the present invention may be practiced without some of these specific details. In other instances, well-known structures and devices are shown in block diagram form.

Embodiments of the present invention include various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, Compact Disk Read-Only Memories (CD-ROMs), and magneto-optical disks, Read-Only Memories (ROMs), Random Access Memories (RAMs), Erasable Programmable Read-Only Memories (EPROMs), Electronically Erasable Programmable Read-Only Memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to PCI, the method and apparatus described herein are equally applicable to other multi-drop bus standards that impose ordering requirements on communications.

Figure 1:
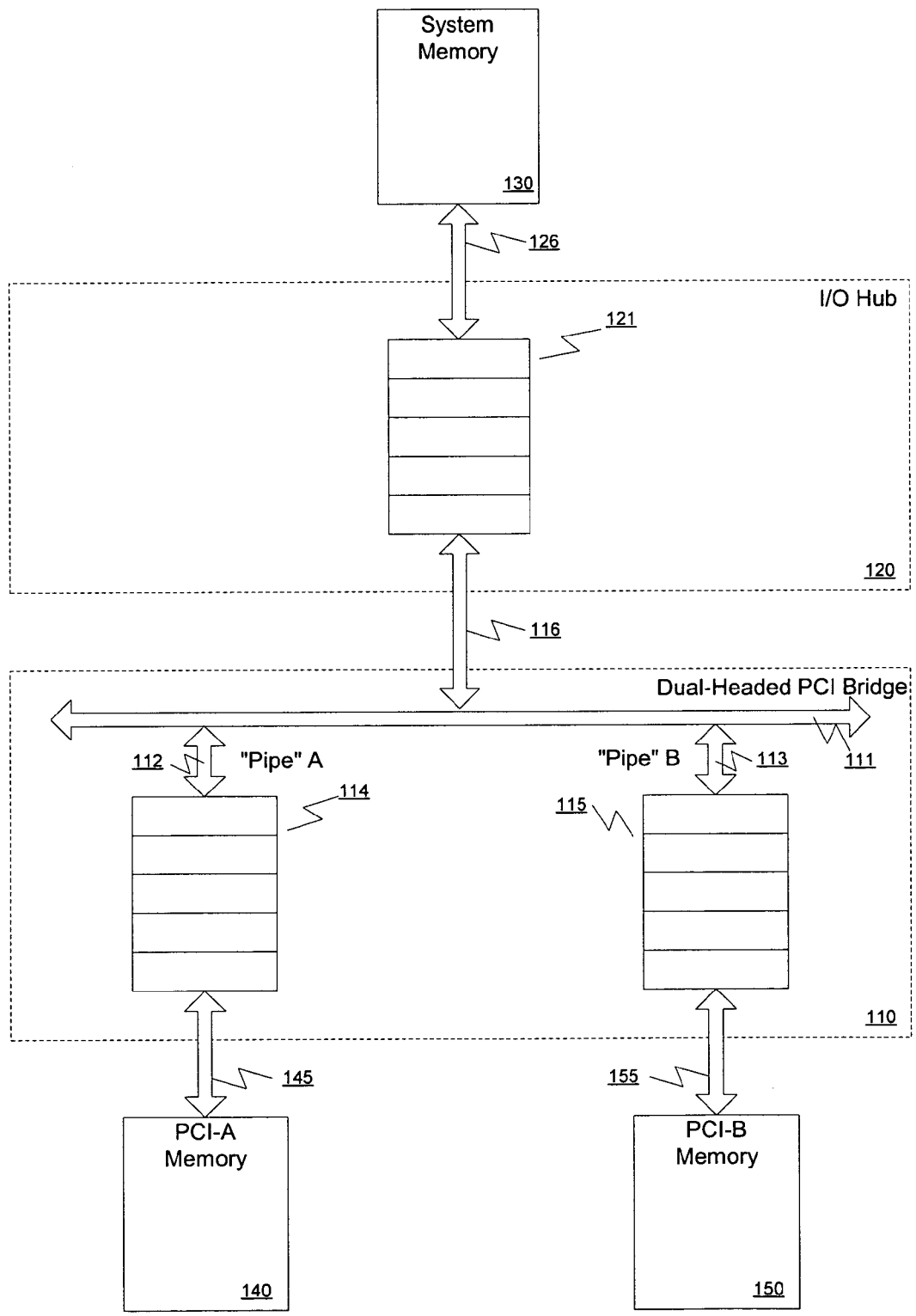
FIG. 1 is a block diagram illustrating a typical dual-headed PCI bridge and I/O hub.

FIG. 1 is a block diagram illustrating a typical PCI-to-PCI bridge and I/O hub. This example illustrates an I/O hub 120 and a dual-headed PCI bridge 110. Connected with the I/O hub 120 via a communication link 126 is a system memory 130. The I/O hub 120 also has an interface 116 for connection with the PCI bridge 110. Of course, the communication link 126, in actual applications, may not provide a direct link as shown here. The link 126 may connect to another device such as an interface or controller not shown here for simplicity. Additionally, this example illustrates only one PCI bridge 110 and one interface 116 between the I/O hub 120 and the single PCI bridge 110. However, in practice, multiple interfaces 116 and multiple bridges 110 may be used. The I/O hub 120 also includes a buffer (also referred to herein as a "pipe") 121 for temporarily storing communications between the PCI bridge 110 and system memory 130. In some applications, this buffer 121 may comprise a queue or random access buffers. Additionally, the bridge 110 may be other than dual-headed and other than PCI. For example, the bridge may support four independent buses and may use protocol such as Third Generation Input/Output Architecture (3GIO) or other current or future interconnect protocol.

The PCI bridge 110 includes an internal bus 111 with which the interface 116 to the I/O hub 120 is connected. In some applications, there may be a buffer (not shown) positioned between the PCI bridge internal bus 111 and the interface 116 to the I/O hub 120. The PCI bridge 110 also includes a plurality of connections 112 and 113 with the internal bus 111, buffers 114 and 115, and two independent bus segments 145 and 155 collectively referred to as "pipe" A and "pipe" B. Of course, more than two sets of connections, buffers, and independent bus segments may be present. In overview, the bridge 110 in this example has ordering buffers 114 and 115 for each bus segment 145 and 155 and connections 112 and 113 to an internal bus 111 to allow interaction between devices 140 and 150 connected with the bus segments 145 and 155 and between the devices 140 and 150 and system memory 130 via the I/O hub 120. The ordering buffers 114 and 115 may comprise queues or random access buffers.

Figure 2:
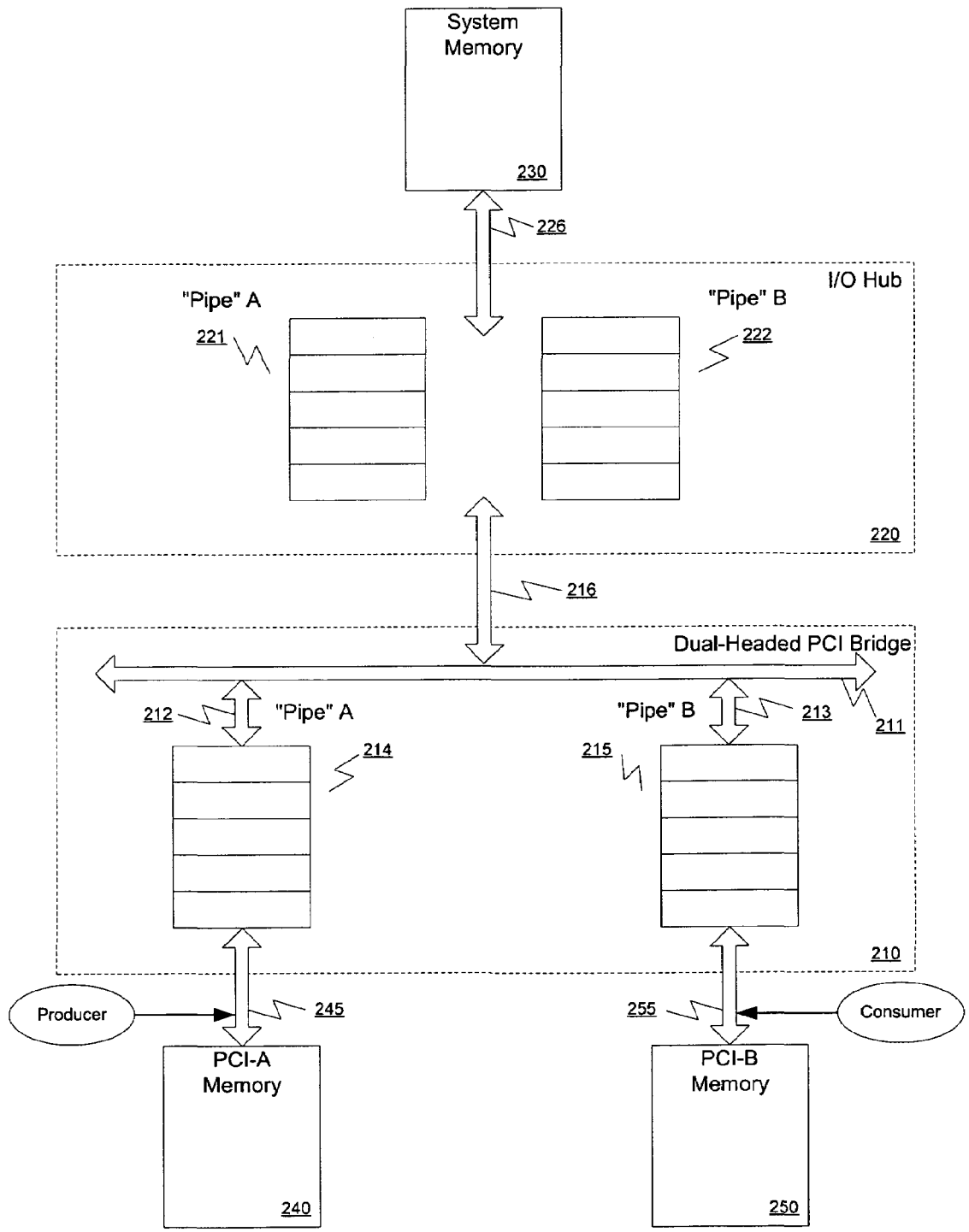
FIG. 2 is a block diagram illustrating a dual-headed PCI-to-PCI bridge and I/O hub according to one embodiment of the present invention.

FIG. 2 is a block diagram illustrating a dual-headed PCI-to-PCI bridge and I/O hub according to one embodiment of the present invention. This example, as with the example illustrated in FIG. 1, illustrates an I/O hub 220 and a PCI bridge 210. As in FIG. 1, connected with the I/O hub 220 via a physical communication link 226 is a system memory 230. The I/O hub 220 also has an interface 216 for connection with the PCI bridge 210. The I/O hub 220 in this example includes a plurality of bufers 221 and 222 for temporarily storing communications between the PCI bridge 210 and system memory 230. These buffers correspond to the buffers 214 and 215 of the PCI bridge 210. In other words, the contents of the buffers 214 and 215 of the independent bus segments 245 and 255 of the PCI bridge 210 are transferred through the PCI bridge internal bus 211 to the separate buffers 221 and 222 of the 110 hub, allowing the "pipes" 212 and 213 to remain independent. Therefore, the two separate buffers allow traffic from one bus segment and one device 240 to have no ordering implications on traffic from the other bus segment and another device 250. The buffers 221 and 222 may comprise queues or random access buffers in which the content from the independent "pipes" is distinguished by control logic.

To allow the plurality of buffers 214 and 215 to be transferred over the single interface 216 between the bridge 210 and the I/O hub 220 and mapped to the proper buffer 221 and 222 in the hub 220, the bridge 210 identifies each transaction with the bus from which it came. This may be done with an identifier tagged to each transaction and used to de-multiplex the transaction at the I/O hub 220. According to one embodiment of the present invention, the identifier comprises a "pipe" designator made up of a combinations of a hub identifier (HubID) and pipe identifier (PipeID).

Bus standards such as PCI have ordering rules. For example, if a write command is issued followed by a read command, the read cannot pass the write in order to prevent reading of stale data. Without independent buffers 221 and 222 in the I/O hub, a write command from one bus followed by a read command from another bus may cause these ordering rules to be applied unnecessarily to independent transactions. When the I/O hub contains a single buffer, as illustrated in FIG. 1, when the commands reach the single buffer of the I/O hub they are no longer treated independently, as the I/O hub does not know that they were separate and imposes ordering requirements whether necessary or not. However, a new problem may arise that will be described in greater detail below. Briefly, the problem arises that the producer/consumer model may be violated if one buffer is processed faster than the other.

Figure 3:
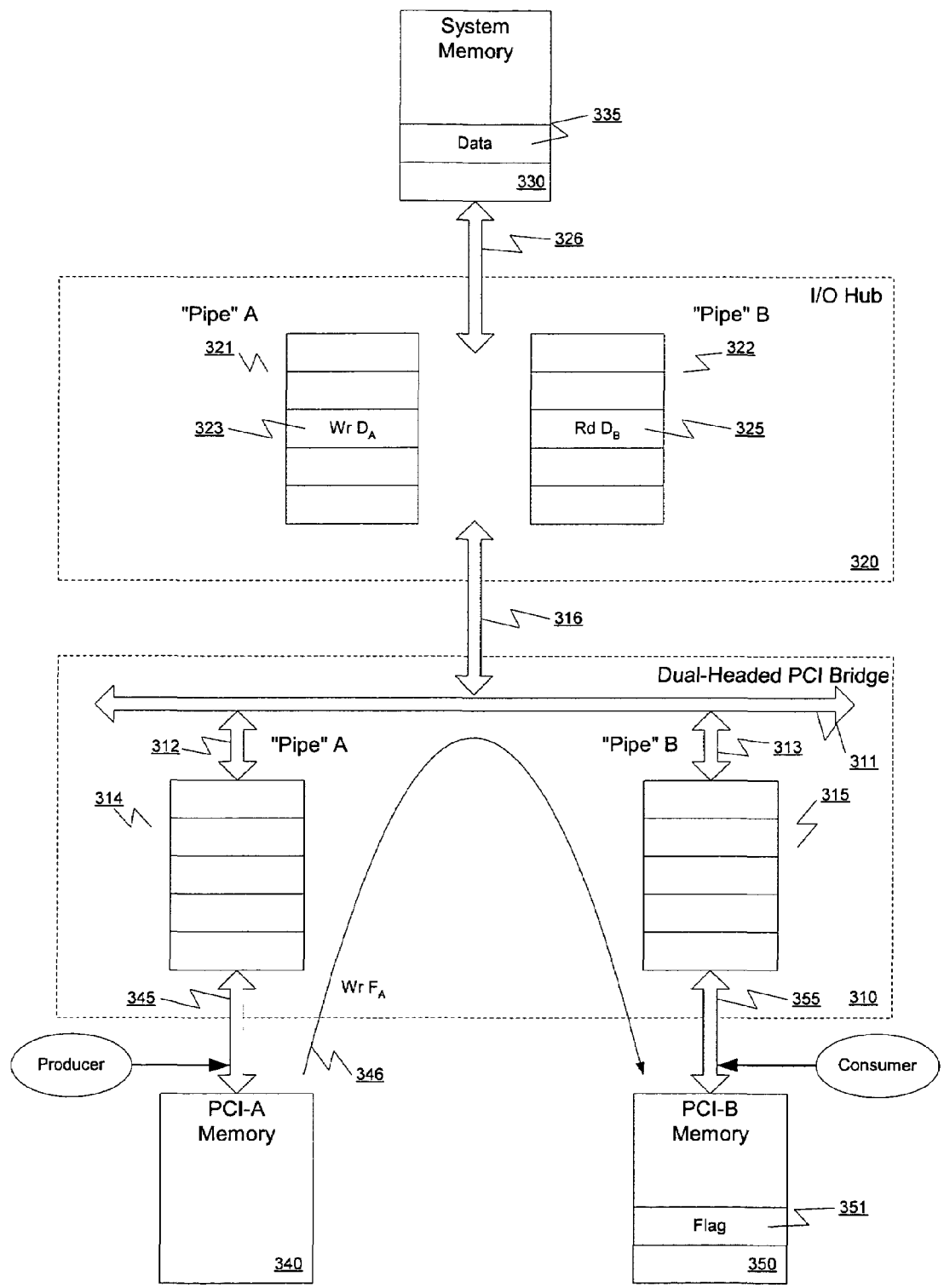
FIG. 3 is a block diagram illustrating data flow in a dual-headed PCI-to-PCI bridge and I/O hub according to one embodiment of the present invention.

FIG. 3 is a block diagram illustrating another dual-headed PCI-to-PCI bridge 310 and I/O hub 320. Connected with the I/O hub 320 via a communication link 326 is a system memory 330. The I/O hub 320 also has an interface 316 for connection with the PCI bridge 310. The I/O hub 320 also includes two buffers 321 and 322 (also referred to herein as a "pipes") for temporarily storing communications between the PCI bridge 310 and system memory 330. The PCI bridge 310 includes an internal bus 311 with which the interface 316 to the I/O hub 320 is connected and connections 312 and 313 with the internal bus 311, buffers 314 and 315, and two independent bus segments 345 and 355 collectively referred to as "pipe" A and "pipe" B. The ordering buffers 314 and 315 for each bus segment 345 and 355 allow interaction between devices 340 and 350 connected with the bus segments 345 and 355 and between the devices 340 and 350 and system memory 330 via the I/O hub 320.

FIG. 3 is a block diagram illustrating data flow in a dual-headed PCI-to-PCI bridge and I/O hub according to one embodiment of the present invention. In this example, devices 340 and 350 on separate, independent bus segments 345 and 355 are writing and reading data following a producer/consumer model. Here, the device 340 on "pipe" A functions as the producer and the device 350 on "pipe" B functions as the consumer. Assume, for the sake of discussion, that the data 335 resides in system memory 330 while a flag 351 or semaphore indicating the availability of new data resides on device 350 on "pipe" B, the consumer. Of course, the producer, consumer, data and flag may reside anywhere on the system.

In this example, the producer 340 writes the data 335 and subsequently writes 346 the flag 351. The two writes keep in order through the PCI bridge 310. The data write is sent to the I/O hub 320 and the system memory 330 while the flag write 346 is a peer-to-peer write and is written directly to the local memory of the consumer 350. The consumer 350 is polling the flag 351 and eventually sees it has been updated by the producer 340. The consumer 350 then proceeds to read the data 335 from system memory 330.

In this example, the two bus segments 345 and 355 of the bridge 310 are mapped using two different "pipes." That is, all I/O traffic from the producer 340 is mapped to a single pipe represented by buffer 314 in the bridge 310 and buffer 321 in the hub 320 and all traffic from the consumer 350 is mapped to another single pipe represented by buffer 315 in the bridge 310 and buffer 322 in the hub 310. Since transactions in different "pipes" are independent and allowed to be processed out of order within the I/O hub, it is possible for the data read request 325 in "pipe B" from the consumer 350 to pass the write data request 323 in "pipe A" from the producer 340. This will break the producer-consumer model since the consumer might read stale data from the main memory.

In order to prevent such a violation of the producer consumer rules, the PCI bridge may issue a fence command to the I/O hub whenever a peer-to-peer write occurs within the bridge. Alternatively, as will be discussed below, the fence command may be issued by the device issuing the write command. According to one embodiment of the present invention, the fence command forces all preceding posted write commands to be observed by the system before any subsequent commands are allowed to proceed. In this manner, the fence command forces ordering across all pipes and the data read will be forced to follow all preceding write commands including the data write initiated on another bus segment.

Figure 4:
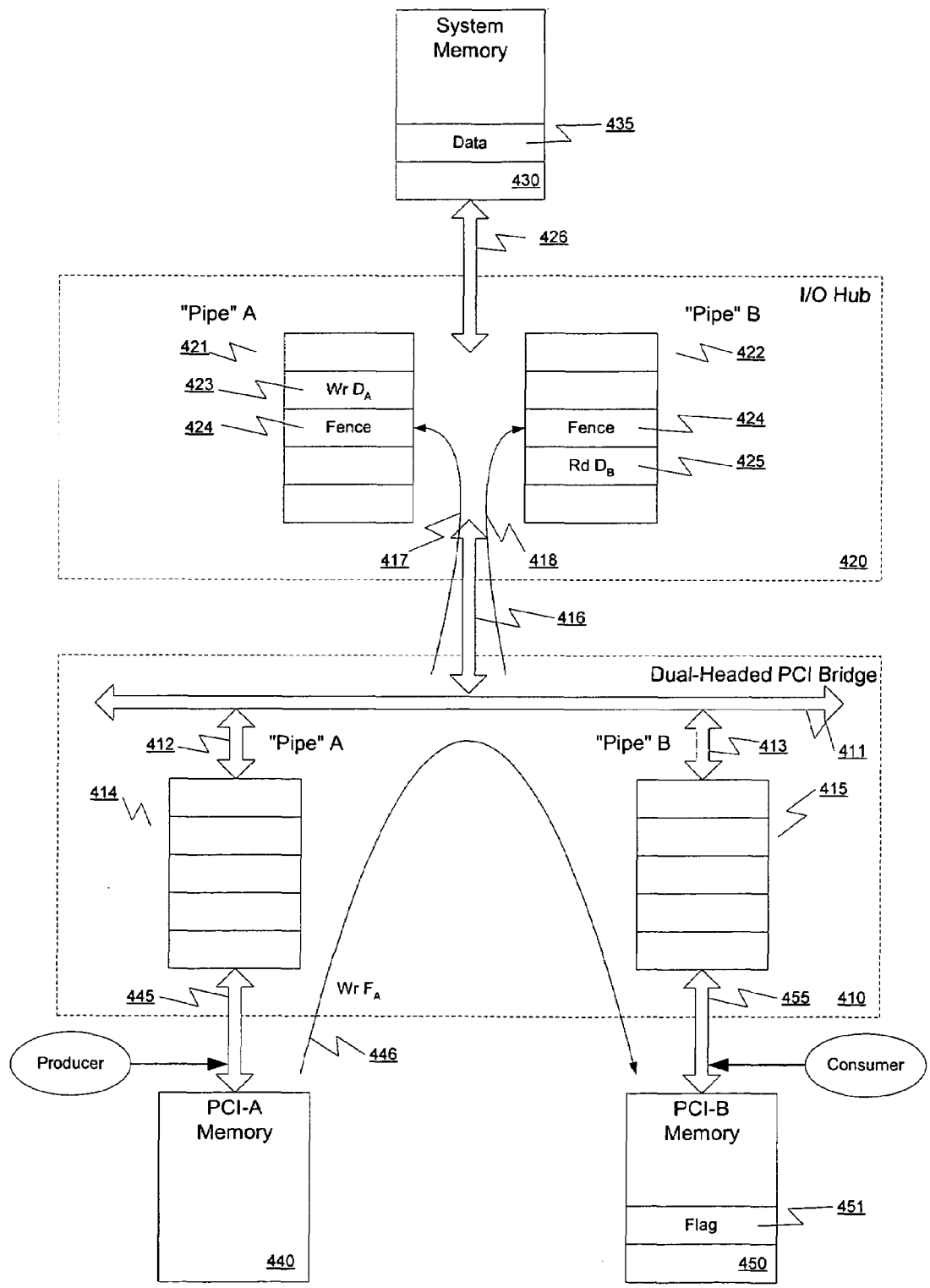
FIG. 4 is a block diagram illustrating data flow with a fence cycle in a dual-headed PCI-to-PCI bridge and I/O hub according to one embodiment of the present invention.

FIG. 4 is a block diagram illustrating another dual-headed PCI-to-PCI bridge 410 and I/O hub 420. Connected with the I/O hub 420 via a communication link 426 is a system memory 430. The I/O hub 420 also has an interface 416 for connection with the PCI bridge 410. The I/O hub 420 also includes two buffers 421 and 422 (also referred to herein as a "pipes") for temporarily storing communications between the PCI bridge 410 and system memory 430. The PCI bridge 410 includes an internal bus 411 with which the interface 416 to the I/O hub 420 is connected and connections 412 and 413 with the internal bus 411, buffers 414 and 415, and two independent bus segments 445 and 455 collectively referred to as "pipe" A and "pipe" B. The ordering buffers 414 and 415 for each bus segment 445 and 455 allow interaction between devices 440 and 450 connected with the bus segments 445 and 455 and between the devices 440 and 450 and system memory 430 via the I/O hub 420.

FIG. 4 is a block diagram illustrating data flow with a fence cycle in a dual-headed PCI-to-PCI bridge and I/O hub according to one embodiment of the present invention. In this example, as with the example illustrated in FIG. 3, devices 440 and 450 are on separate, independent bus segments 445 and 455 and are writing and reading data following a producer/consumer model. The device 440 on "pipe" A functions as the producer and the device 450 on "pipe" B functions as the consumer. The data 435 resides in system memory 430 while the flag 451 or semaphore resides on the device 450 on "pipe" B, the consumer.

In this example, the producer 440 writes the data 435 and subsequently writes 446 the flag 451. The two writes keep in order through the PCI bridge 410. The data write is sent to the system memory 430 via the I/O hub 420 while the flag write 446 is a peer-to-peer write and is directed to the consumer 450. According to one embodiment of the present invention, based on the transaction information, the bridge 410 may identify the flag write as a peer-to-peer write and generate a fence. The fence is then sent 417 and 418 to both buffers 421 and 422 of the I/O hub 420 where they are inserted 424 behind the data write command 423. Alternatively, the fence command may be written into the queues 414 and 415 in the bridge 410 behind the write flag command 446 and transferred from the queues 414 and 415 of the bridge 410 to the queues 421 and 422 of the hub 420 along with other data in the "pipes."

With the fence command 424 inserted into both buffers 421 and 422 of the I/O hub after the data write command 423 but before subsequent commands such as the data read 425, the I/O hub may process the buffers 421 and 422 independently. Then, once a fence command 424 is encountered in either buffer 421 or 422, the processing of that buffer is suspended until the corresponding fence is encountered in the other buffer. In this manner, the data read command 425 cannot be handled before the data write command 423 and the producer/consumer model will not be violated.

Figure 5:
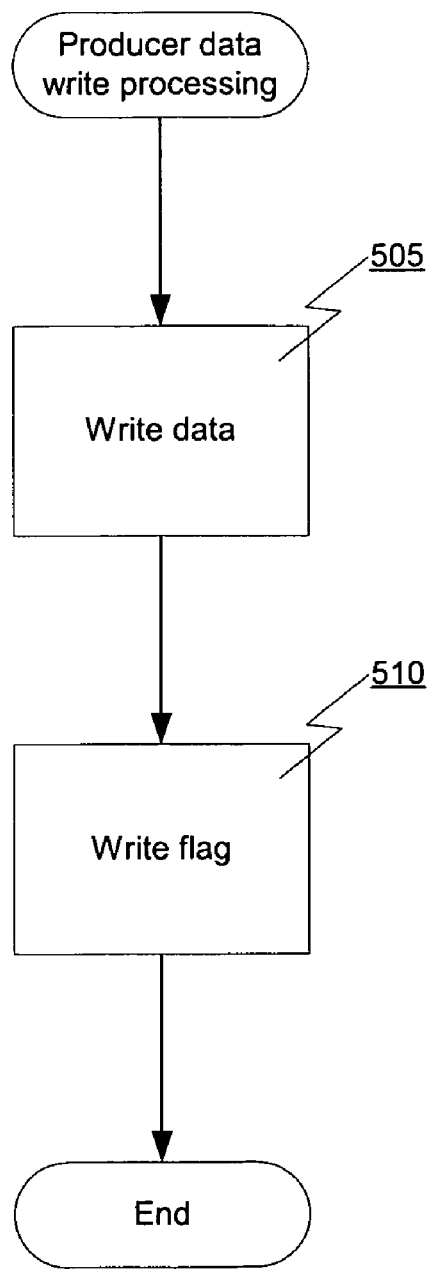
FIG. 5 is a flowchart illustrating a high-level view of a producer data write process.

FIG. 5 is a flowchart illustrating a high-level view of a producer data write process. First, at processing block 505, the producer issues a write data command as discussed above. Next, at processing block 510, the producer issues a write flag command also as discussed above. The write flag command may be, as described, a peer-to-peer write to another device on an independent bus. This is the transaction that triggers the issuance of the fence command by the producer or bridge, depending upon the particular implementation.

Figure 6:
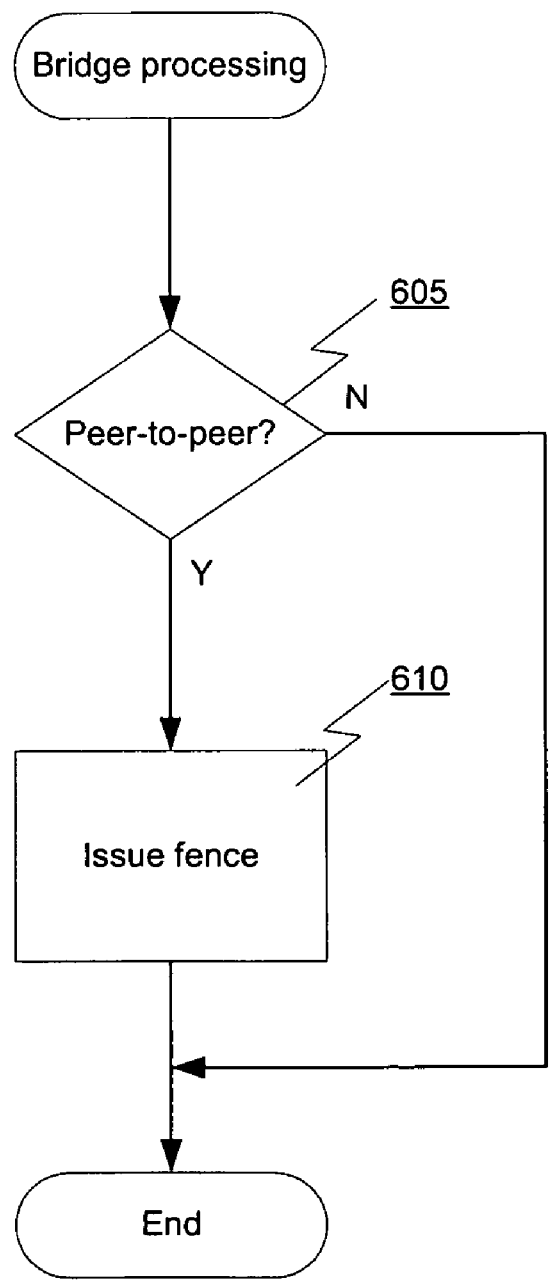
FIG. 6 is a flowchart illustrating bridge processing according to one embodiment of the present invention.

FIG. 6 is a flowchart illustrating bridge processing according to one embodiment of the present invention. First, at decision block 605, a determination is made whether a write command issued by a first device is a peer-to-peer write command directed to a second device on another bus connected on the same side of the bridge. Next, at processing block 610, a fence command is issued responsive to the write command being determined to be a peer-to-peer write command. As explained above, the fence command is written into each buffer of a plurality of buffers in an I/O hub connected with the bridge.

Figure 7:
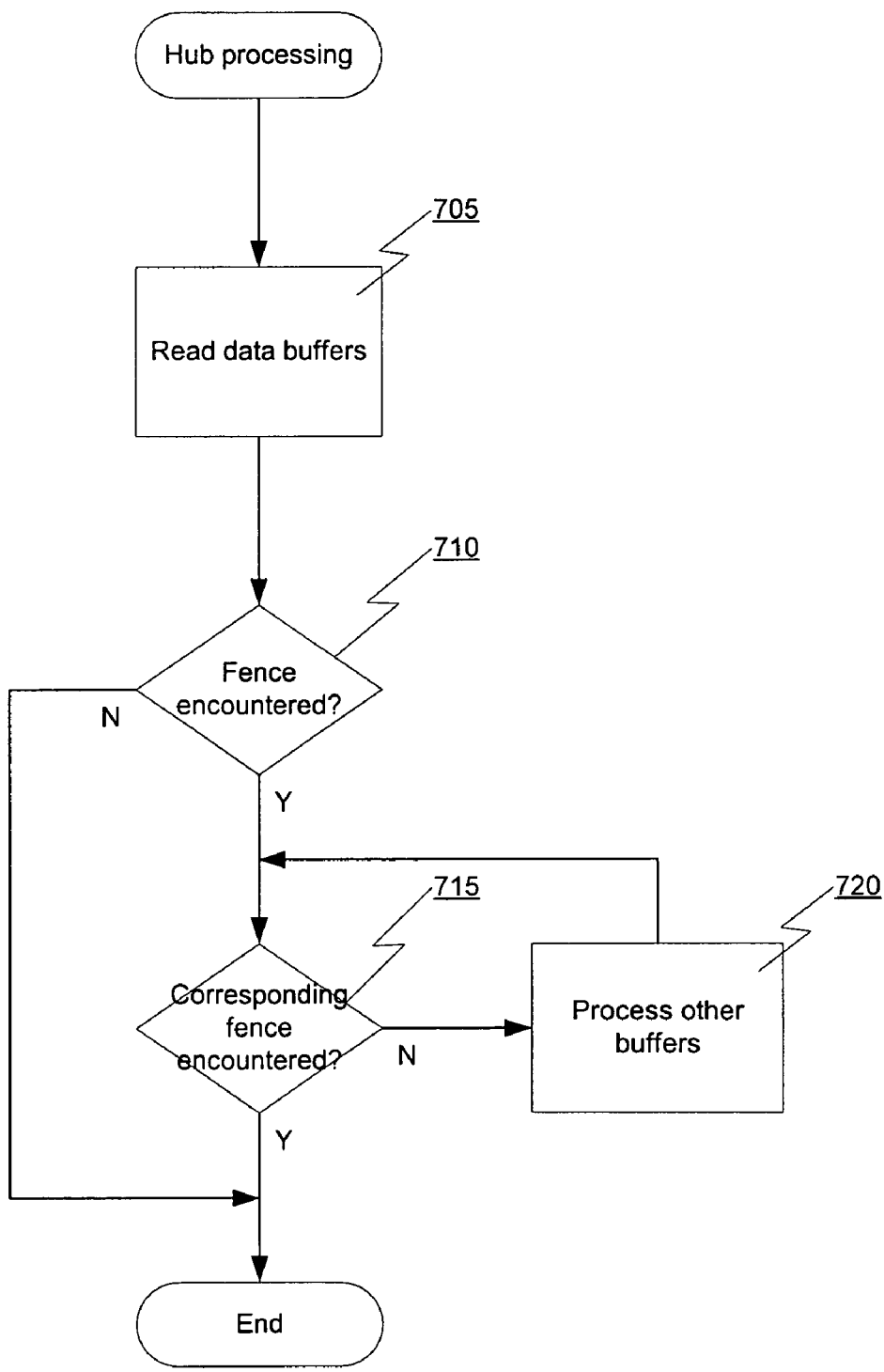
FIG. 7 is a flowchart illustrating hub processing according to one embodiment of the present invention.

FIG. 7 is a flowchart illustrating hub processing according to one embodiment of the present invention. First, at processing block 705, data is read from at least one of a plurality of buffers in an I/O hub. At decision block 710, a determination is made whether a fence command has been read from the buffer. At decision block 715, a determination is made whether a corresponding fence command has been read from all other buffers in the plurality of buffers. If a corresponding fence has not been read from all other buffers, processing of subsequent commands from buffers from which a fence has been read is suspended and all other buffers are processed at processing block 720 until all corresponding fence commands are read.

Figure 8:
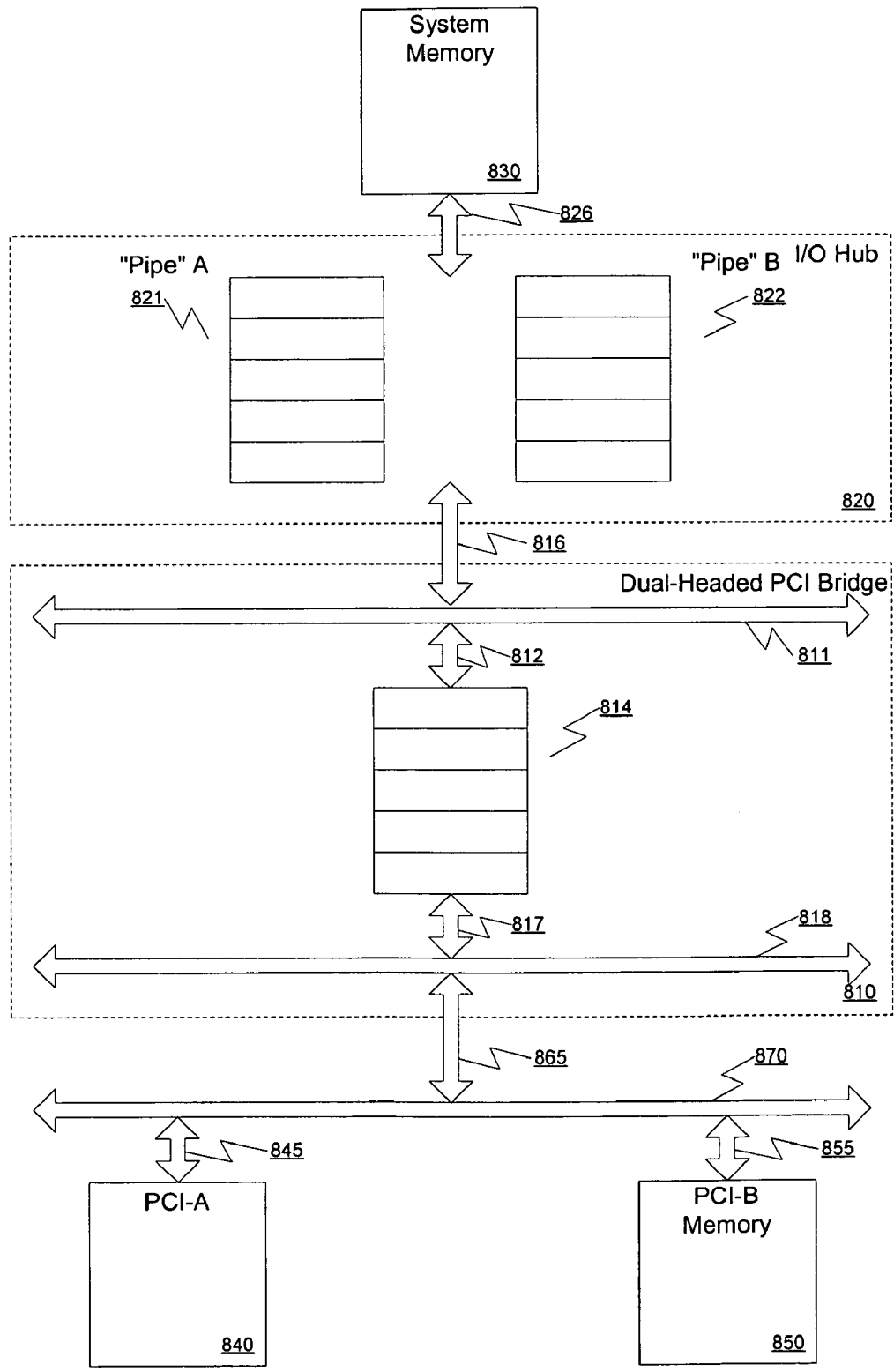
FIG. 8 is a block diagram illustrating a dual-headed PCI-to-PCI bridge and I/O hub according to an alternative embodiment of the present invention.

FIG. 8 is a block diagram illustrating a dual-headed PCI-to-PCI bridge and I/O hub according to an alternative embodiment of the present invention. This example, similar to the example illustrated in FIG. 2, illustrates an I/O hub 820 and a PCI bridge 810. As in FIG. 2, connected with the I/O hub 820 via a physical communication link 826 is a system memory 830. The I/O hub 820 also has an interface 816 for connection with the PCI bridge 810. The I/O hub 820 in this example includes a plurality of buffers 821 and 822 for temporarily storing communications between the PCI bridge 810 and system memory 830.

The PCI bridge 810 includes an internal bus 811 with which the interface 816 to the I/O hub 820 is connected and a connection 812 with the internal bus 811 and a buffer 814.

The differences between this example and the one illustrated in FIG. 2 are in the PCI bridge 810. In this example, The PCI bridge 810 has only a single buffer 814 for temporarily storing communications between the I/O hub 820 and the bus segments 845 and 855. Additionally, the PCI bridge includes a second internal bus 818 with a link 817 to the buffer 814 and coupled with a an external bus 870 with which the independent buses 845 and 855 are connected via a physical link 865. The external bus 870, as will be described below, passes peer-to-peer communications between PCI devices 840, 850 through the independent bus segments 845 and 855 without passing them through the bridge 810.

The contents of the independent bus segments 845 and 855 are transferred to the separate buffers 821 and 822 of the I/O hub 820, via the single buffer 814 of the PCI bridge 810. To allow the communications from the independent buses 845 and 870 to be transferred over the single buffer 814 of the PCI bridge 810 and mapped to the proper buffer 821 and 822 in the hub 820, the bridge 810 labels each transaction based upon the bus 845 or 855 from which it originated prior to the transaction being inserted in the buffer 814. This may be done with an identifier tagged to each transaction which may be used to de-multiplex the transaction at the I/O hub 820. According to one embodiment of the present invention, the identifier comprises a "pipe" designator made up of a combination of a hub identifier (HubID) and pipe identifier (PipeID).

Figure 9:
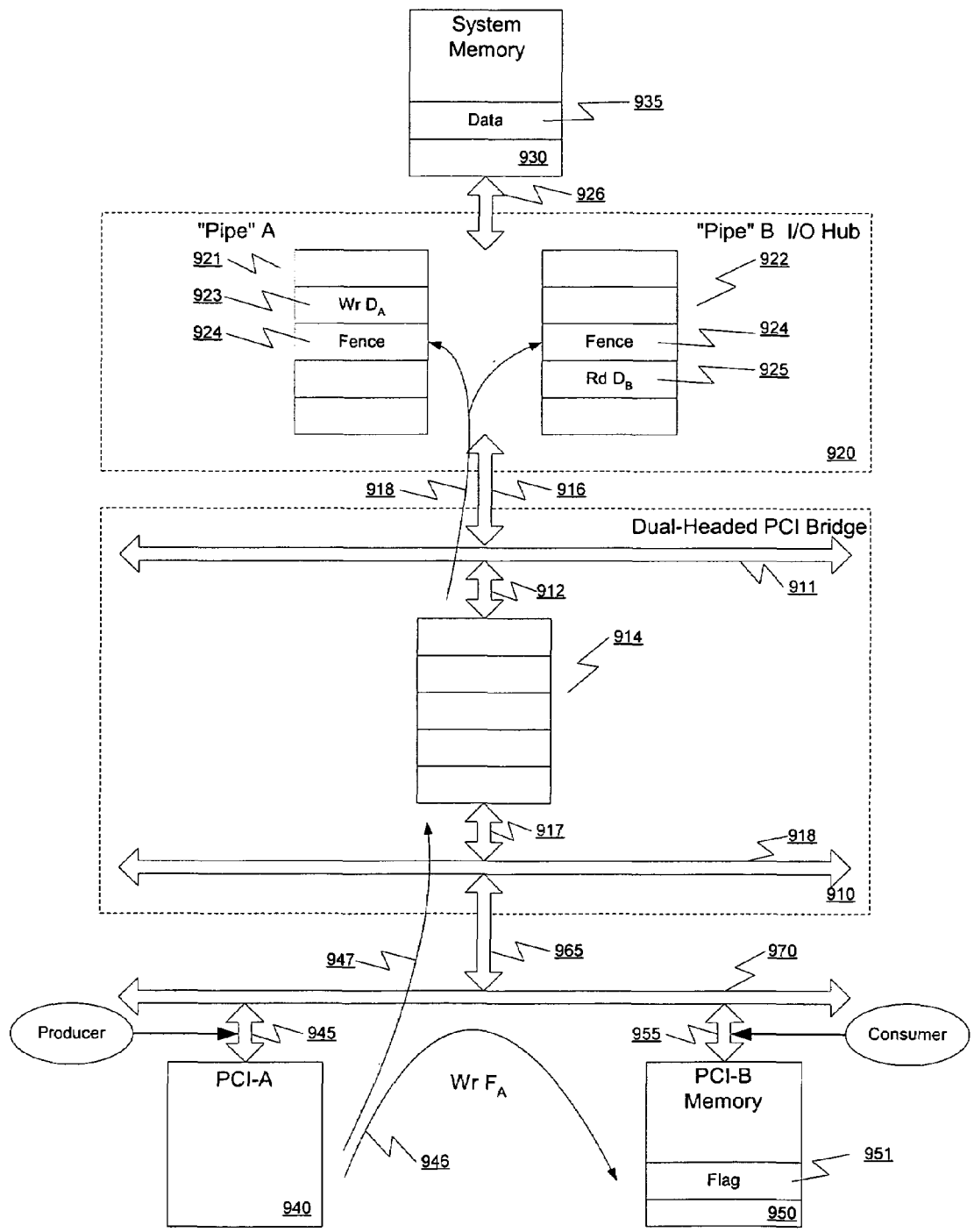
FIG. 9 is a block diagram illustrating data flow with a fence cycle in a dual-headed PCI-to-PCI bridge and I/O hub according to an alternative embodiment of the present invention.

FIG. 9 is a block diagram illustrating another dual-headed PCI-to-PCI bridge 910 and I/O hub 920. Connected with the I/O hub 920 via a communication link 926 is a system memory 930. The I/O hub 920 also has an interface 916 for connection with the PCI bridge 910. The I/O hub 920 also includes two buffers 921 and 922 (also referred to herein as a "pipes") for temporarily storing communications between the PCI bridge 910 and system memory 930. The PCI bridge 910 includes an internal bus 911 with which the interface 916 to the I/O hub 920 is connected and a connection 912 with the internal bus 911, to a buffer 914. The buffer is also connected to a second internal bus 918 coupled with an external bus 970 with which independent buses 945 and 955 are connected via a physical link 965. The external bus 970 passes peer-to-peer communications between the independent bus segments 945 and 955 without passing them through the bridge 910.

FIG. 9 is a block diagram illustrating data flow with a fence cycle in a dual-headed PCI-to-PCI bridge and I/O hub according to an alternative embodiment of the present invention. In this example, similar to the example illustrated in FIG. 4, devices 940 and 950 are on separate, independent bus segments 945 and 955 and are writing and reading data following a producer/consumer model. The device 940 on "pipe" A functions as the producer and the device 950 on "pipe" B functions as the consumer. The data 935 resides in system memory 930 while the flag 951 or semaphore resides on the device 950 on "pipe" B, the consumer.

In this example, the producer 940 writes the data 935 and subsequently writes 946 the flag 951. The two writes keep in order through the PCI bridge 910. The data write is sent 947 via the I/O hub 920 to the system memory 930 while the flag write 946 is a peer-to-peer write and is written directly to the consumer 950. Therefore, this example is similar to the one illustrated in FIG. 4. As in FIG. 4, the producer 940 writes the data 935 and subsequently writes 946 the flag 951. The two writes keep in order through the PCI bridge 910. The data write is sent 947 to the system memory 930 via the I/O hub 920 while the flag write 946 is a peer-to-peer write and is directed to the consumer 950. Based on the transaction information, the bridge 910 may identify the flag write as a peer-to-peer write and generates a fence. The fence is then sent 918 to both buffers 921 and 922 of the I/O hub 920 where they are inserted 924 behind the data write command 923. With the fence command 924 inserted, the data read command 925 cannot be handled before the data write command 923 and the producer/consumer model will not be violated. In contrast to the embodiment of FIG. 4, the write flag transaction 946 is conducted between two devices 940 and 950 on the external bus 970 rather than being propagated through the bridge 910 as in the first scenario illustrated in FIG. 4.

The PCI bridge 910 has visibility into transactions on the external bus 970 and can therefore detect peer-to-peer transactions on the bus 970. Once a peer-to-peer communication has been detected, the bridge 910 can apply a fence to the buffer 914. This fence will then be transferred to the buffers 921 and 922 of the I/O hub 920.

What is claimed is:

1. A method comprising:
monitoring a plurality of buses connected to a first side of a bridge, the plurality of buses comprising at least a first bus and a second bus;
determining whether a write command issued on the first bus by a first device is a peer-to-peer write command directed to a second device on the second bus; and
based on the determining, issuing a fence command into a first command buffer coupled to the first bus and into a second command buffer coupled to the second bus, the fence commands determining an ordering of commands in the first and second command buffers, and causing pending input/output transactions to be temporarily ordered in response to determining the write command is a peer-to-peer write command.

2. The method of claim 1, wherein said determining whether the write command is a peer-to-peer write command is performed by the bridge.

3. The method of claim 1, wherein said determining whether the write command is a peer-to-peer write command is performed by the first device.

4. The method of claim 1, wherein an I/O hub is coupled to a second side of the bridge.

5. The method of claim 1, wherein the first and second buffers comprise a plurality of queues.

6. The method of claim 1, wherein said issuing is performed by the bridge.

7. The method of claim 1, wherein said issuing is performed by the first device.

8. The method of claim 1, wherein the first bus is a PCI bus.

9. The method of claim 1, wherein the second bus is a PCI bus.

10. The method of claim 1, further comprising:
reading a first buffer of a plurality of buffers in en the I/O hub;
determining whether the fence command has been read, the fence command indicating a need to temporarily order processing of the plurality of buffers; and
responsive to determining the fence command has been read from the first buffer, prohibiting processing of subsequent commands from the first buffer until a corresponding fence command is read from all other buffers in the plurality of buffers.

11. The method of claim 1, further comprising labeling the write command with an identifier of the second bus.

12. An apparatus comprising:
an internal bus;

a plurality of buffers coupled with the internal bus;

a physical hulk to a plurality of external, independent buses; and a processor to determine whether a write command issued by a first device on a first bus of the plurality of buses is a peer-to-peer write command directed to a second device on a second bus of the plurality of independent buses and, based on this determination, to issue a fence command into each of the plurality of buffers, the fence commands determining an ordering of commands in the plurality of buffers, and to cause pending input/output transactions to be temporarily ordered in response to determining the write command is a peer-to-peer write command.

13. The apparatus of claim 12, wherein the plurality of buffers comprises a plurality of queues.

14. The apparatus of claim 12, wherein the pending input/output transactions are temporarily ordered through an I/O hub coupled to one side of a bridge.

15. The apparatus of claim 12, wherein the first bus is a PCI bus.

16. The apparatus of claim 12, wherein the second bus is a PCI bus.

17. The apparatus of claim 12,
wherein the processor is further to read a first buffer of a the plurality of buffers into the I/O hub, determine whether a fence command has been read, the fence command indicating a need to temporarily order processing of the plurality of buffers, and responsive to determining a fence command has been read from the first buffer, prohibit processing of subsequent commands from the first buffer until a corresponding fence command is read from all other buffers in the plurality of buffers.

18. The apparatus of claim 17, wherein the plurality of buffers in the I/O hub correspond to a plurality of devices on one or more buses connected with the bridge, the bridge being connected with the I/O hub.

19. A machine-readable medium having stored thereon data representing sequences of instructions, the sequences of instructions which, when executed by a processor, cause the processor to:

monitor a plurality of buses connected to a first side of a bridge, the plurality of buses comprising at least a first bus and a second bus;

determine whether a write command issued on the first bus by a first device is a peer-to-peer write command directed to a second device on the second bus; and based on the determining, issue a fence command into a first command buffer coupled to the first bus and into a second command buffer coupled to the second bus, the fence commands determining an ordering of commands in the first and second command buffers, and cause pending input/output transactions to be temporarily ordered in response to determining the write command is a peer-to-peer write command.

20. The machine readable medium of claim 19, wherein an I/O hub is coupled to a second side of the bridge.

21. The machine-readable medium of claim 19, wherein the first and second buffers comprises a plurality of queues.

22. The machine-readable medium of claim 19, wherein said bridge issues the fence command.

23. The machine-readable medium of claim 19, wherein said first device issues the fence command.

24. The machine-readable medium of claim 19, wherein the first bus is a PCI bus.

25. The machine-readable medium of claim 19, wherein the second bus is a PCI bus.

26. The machine-readable medium of claim 19, further comprising sequences of instructions which, when executed by the processor, cause the processor to:

read a first buffer of a plurality of buffers in the I/O hub;

determine whether the fence command has been read, the fence command indicating a need to temporarily order processing of the plurality of buffers; and responsive to determining the fence command has been read from the first buffer, prohibit processing of subsequent commands from the first buffer until a corresponding fence command is read from all other buffers in the plurality of buffers.

* * * * *